United States Patent [19]

Meyer et al.

[11] 4,004,883

[45] Jan. 25, 1977

[54] SENSING, LEVELING AND MIXING APPARATUS

[75] Inventors: Rolf Meyer, Des Plaines; Manuel I. Martin, Hoffman Estates; Ronald A. Bolton, Chicago, all of Ill.

[73] Assignee: G. D. Searle & Co., Skokie, Ill.

[22] Filed: July 11, 1975

[21] Appl. No.: 594,936

[52] U.S. Cl. .................................... 23/259; 23/292

[51] Int. Cl.[2] ...................... C12K 1/00; G01N 1/18

[58] Field of Search .................... 23/259, 292, 253; 259/1 R; 195/143

[56] References Cited

UNITED STATES PATENTS

| | | | |
|---|---|---|---|
| 3,488,156 | 1/1970 | Good et al. | 23/253 R |
| 3,522,011 | 7/1970 | Sanderson | 23/259 |
| 3,768,526 | 10/1973 | Sanz et al. | 23/259 X |
| 3,850,580 | 11/1974 | Moore et al. | 23/259 |

*Primary Examiner*—R.E. Serwin
*Attorney, Agent, or Firm*—Walter C. Ramm; Dennis O. Kraft; Peter J. Sgarbossa

[57] ABSTRACT

A support is provided which is arranged to accommodate a plurality of open-ended receptacles such as test tubes. The support includes openings and retainer members which cooperate to frictionally embrace the sides of the tubes so as to permit limited orbital motion of the tubes with respect to the openings. A sensing and leveling assembly beneath the bottoms of the tubes is arranged to cooperate with an arm located above the open ends of the tubes. The sensing and leveling assembly is resilient, such that upon engagement with the bottoms of the tubes they are gently forced against the arm, whereupon the relative positions of the tube bottoms are detected and noted by electronic means. The release of the arm allows the resilience in the sensing and leveling assembly to relax causing the bottoms of the tubes to be raised to a common horizontal plane. Also provided is an assembly for orbitally moving the bottoms of the freely depending tubes by means of cups which rotate about slightly offset centers while the bottoms of the tube reside therewithin.

9 Claims, 5 Drawing Figures

FIG. 2
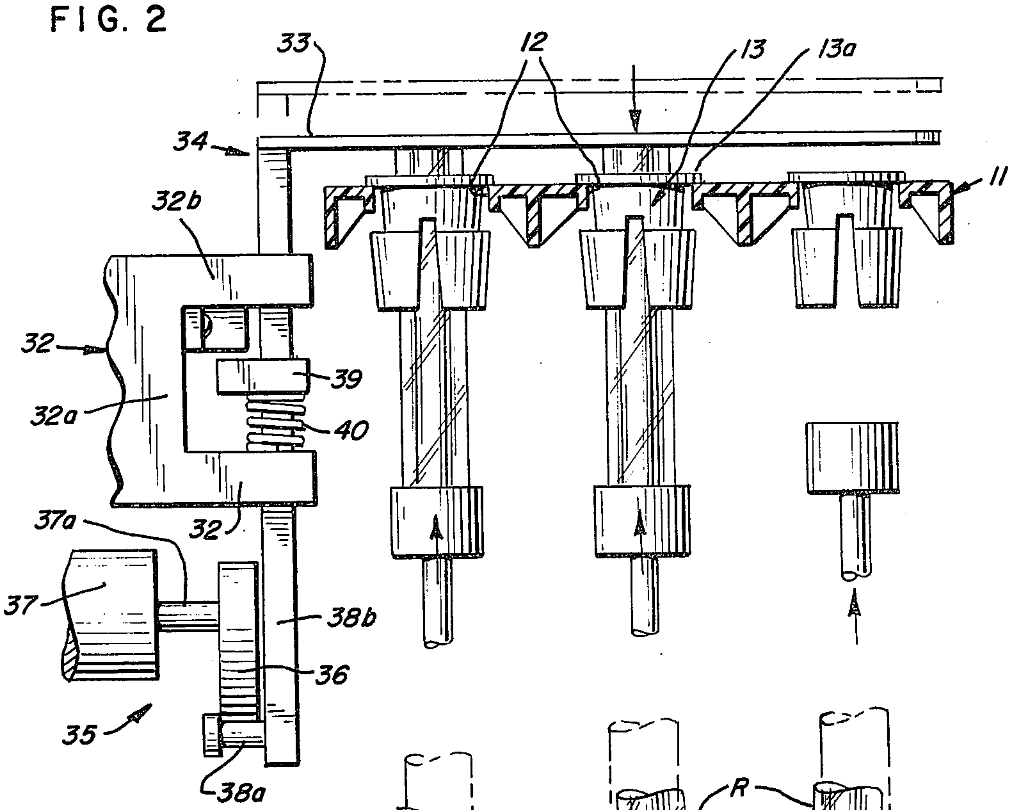
FIG. 5
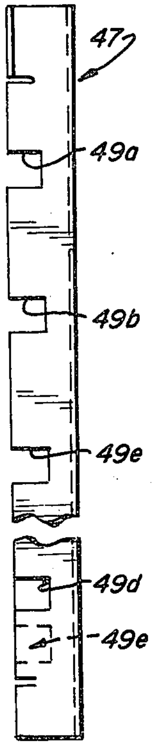
FIG. 4
FIG. 3
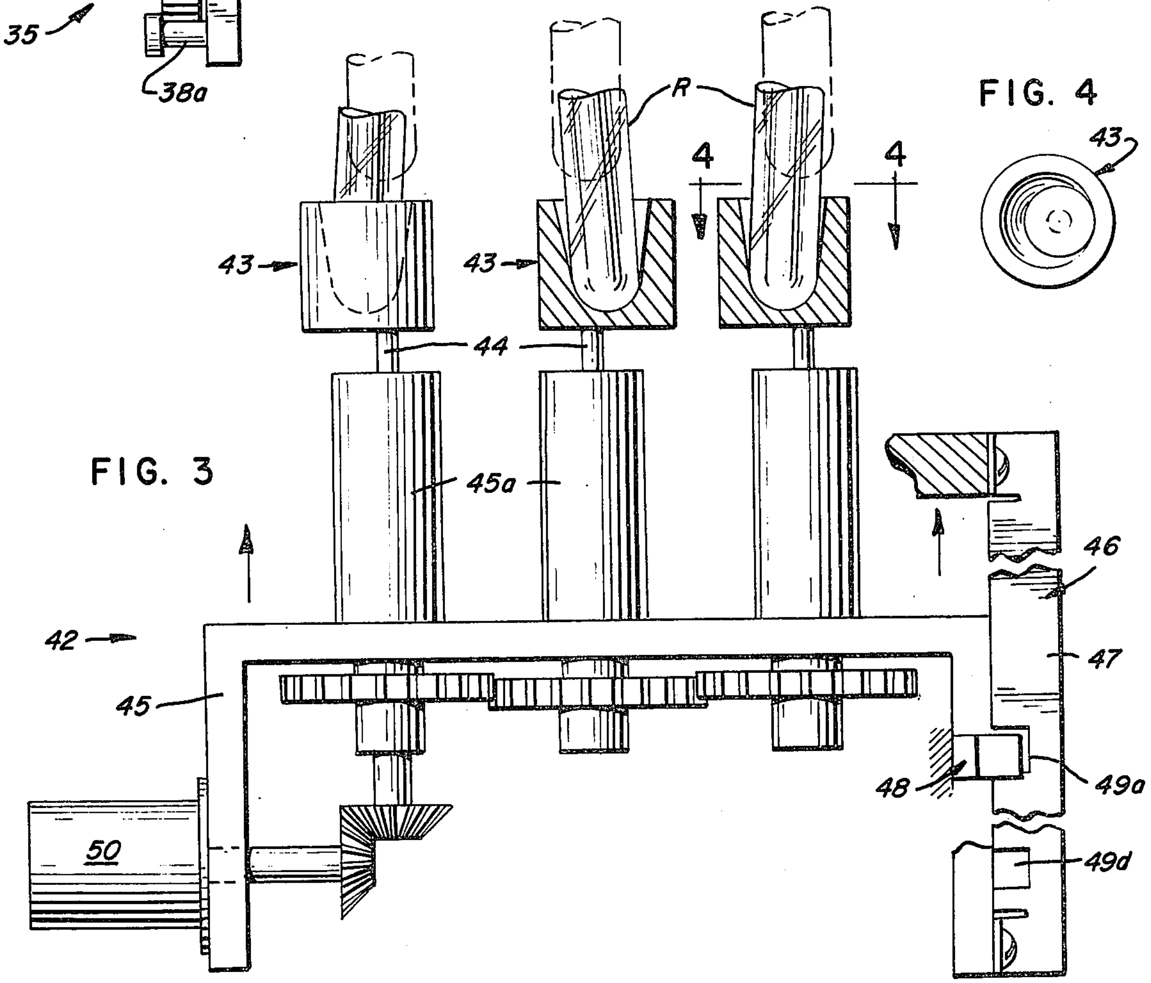

SENSING, LEVELING AND MIXING APPARATUS

BACKGROUND OF THE INVENTION

Heretofore, the handling of a plurality of open end receptacles, such as test tubes, in which specimens and samples thereof have been collected for subsequent analysis, has normally required a substantial amount of time and manual effort. In addition, such a procedure required the exercise of extreme care on the part of the person handling the receptacles so as to maintain segregation thereof and/or prevent contamination of the collected specimens or samples. Similarly, replication requires the various receptacles to be uniformly handled. Because of problems such as these, apparatus such as disclosed in pending United States application Ser. No. 312,894, filed Dec. 7, 1972, and now abandoned have been utilized to accurately and quickly prepare the necessary samples of a specimen so that numerous tests can be accurately performed thereon.

Various automatic tube-handling assemblies have heretofore been provided for simultaneously handling such tubes; however, because of certain design characteristics, such assemblies have been beset with one or more of the following shortcomings: (a) the assembly was unable to accommodate receptacles of various sizes; (b) the accommodated receptacles were susceptible to damage or breakage; (c) the receptacles when accommodated within the assembly, were not readily capable of being orbitally moved to produce vertical motion to the fluids within the receptacles; (d) the accommodated receptacles were not automatically detected, leveled and orbitally moved by the apparatus of the type disclosed in the aforementioned pending application; (e) the apparatus was costly, bulky, awkward to use and of fragile construction, and (f) the apparatus was unable to handle several receptacles in a uniform manner.

SUMMARY OF THE INVENTION

Thus, it is an object of the invention to provide an apparatus which avoids the aforenoted shortcomings besetting prior devices.

It is a further object of the invention to provide an apparatus which may readily handle various test tube sizes in an automatic manner providing prescribed manipulations for each.

It is a further object of the invention to provide an apparatus with an automatic sensing mechanism thereby avoiding breakage or damage to test tubes accommodated within the apparatus.

It is still a further object of the invention to provide an apparatus having a leveling device capable of automatically arranging the bottoms of the tubes in a predetermined horizontal plane.

It is yet another object of the invention to provide an apparatus having a means for imparting vortical motion to the fluid contained within freely depending tubes.

Further and additional objects will appear from the description, accompanying drawings and appended claims.

In accordance with one embodiment of the invention, a support having a horizontal tray is provided for use in handling a plurality of open-ended receptacles. The open ends of the receptacles are pressed down and held by an arm so as to prevent upward travel of the receptacles when upward pressure is exerted on the bottoms thereof by means of resiliently mounted cup-shaped members. However, after release of the arm, the resiliently mounted cup-shaped members raise the bottoms of the receptacles to a common horizontal plane. Once the bottoms of the receptacles are properly positioned or leveled, aspiration of material (for example by means of the aspiration tip of the above cross-referenced automatic apparatus) may be carried out with much smaller residual volumes and with the aspiration tip much closer to the bottom of the tube, since tolerance problems have been eliminated. At a later station, subsequent to or simultaneously with the filling of the receptacles with reagents, the bottoms thereof are accommodated by a plurality of cups. Each cup is eccentrically mounted to rotate about an offset center so that upon rotation of the cup about a vertical axis orbital motion will be imparted to the suspended bottom of the receptacle.

DESCRIPTION

For a more complete understanding of the invention, reference should be made to the drawings wherein:

FIG. 2 is a fragmentary sectional view taken along lines 2—2 of FIG. 1 and showing in dotted lines the arm which engages the tops of the receptacles in a release position;

FIG. 3 is a fragmentary, front elevational view of the component of the mechanism which imparts vortical motion to the contents of the receptacles;

FIG. 4 is a cross-sectional view taken along lines 4—4 of FIG. 3, and

FIG. 5 is a side elevational view of one complemental section comprising the control mechanism for the component shown in FIG. 3.

Figure 1:
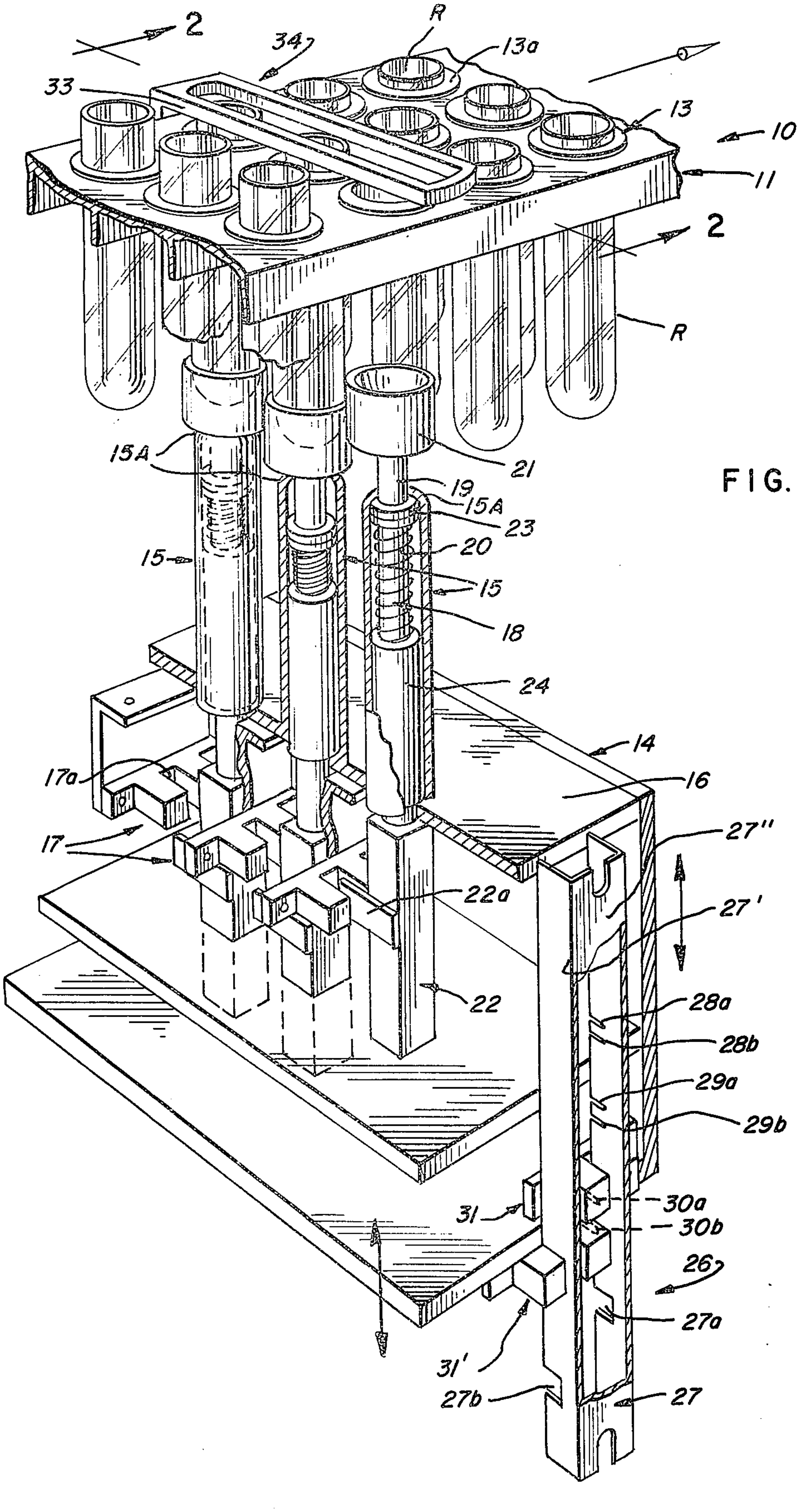
FIG. 1 is a fragmentary, perspective view partly in section of one form of the sensing and leveling mechanism.

Referring now to the drawings and more particularly to FIG. 1, there is shown an apparatus 10 for sensing and leveling a plurality of receptacles such as test tubes or the like. The apparatus 10 is adapted to be utilized in combination with an elongated tray member 11 which accommodates in upright positions a plurality of test tubes R. A complete description of the tray and its salient features is set forth in copending application Ser. No. 483,024, filed June 25, 1974, and related features are set forth in a patent application filed concurrently herewith; both are assigned to the same assignee as the instant application.

The tray or tray member is provided with a number of openings 12 arranged in rows disposed both transverse and parallel to the longitudinal axis of the tray member. The upper open end of each tube R is frictionally embraced by a retainer member 13. Each member 13 has an enlarged annular upper flange 13*a* which is adapted to normally rest upon the top surface of the tray when the member 13 is assembled in an opening of the tray as seen in FIG. 2. Due to the design of the retainer member 13 and the corresponding opening 12 of the tray, the test tube will freely depend from the tray. The vertical distance from the bottom of the test tube to the top surface of the tray may be adjusted by merely overcoming the friction between the retainer member 13 and the exterior of the tube R. A more complete explanation of member 13 is to be found in the above-mentioned copending applications.

The sensing and leveling apparatus 10 includes an elevatable housing 14 having three upstanding tubular pedestals 15, open at both ends, each having an inwardly extending lip 15A at the top end, and a hollow support 16 subtending the pedestals. Disposed within support 16 are a plurality of photoelectric devices 17 which are affixed beneath the pedestals 15 and are adapted to travel up and down with the housing 14.

Associated with each pedestal 15 is a resilient mechanism 18 consisting of a shaft 19 which projects longitudinally upwardly from the end of the pedestal. Encompassing a portion of the shaft disposed within the pedestal is a coil spring 20. In addition, shaft 19 carries a cup-like holder 21 at its exposed upper end and a photoelectric tripping unit 22 at its lower end, the latter being disposed within the support 16. The holder 21, spring 20 and unit 22 are axially aligned and move with shaft 19. A washer 23 is affixed within the lower portion of the pedestal 15, and spring 20 is captured between washer 23 and bearing 24. Lip 15A at the top end of tubular pedestal 15 serves as a stop to prevent washer 33 from emerging beyond the top of pedestal 15. Bearing 24 functions as a guide for shaft 19 when the latter is caused to move independently of the pedestal in a manner to be hereinafter discussed.

Vertical movement of housing 14 causes elongated tubular bearing 24 to compress spring 20 if the cup-like holder 21 is brought to bear against the bottom of a test tube R aligned therewith. The test tube R during this cycle of operation of the housing is held in a fixed vertical position within the tray member by means of a stripper assembly 34 which will be described more fully hereinafter. Coil spring 20 has a sufficiently small K (modulus of elasticity) to prevent the transmission of any forces which might break the test tubes R. However, once the test tube is no longer restrained by the stripper assembly, the friction between retainer member 13 and the exterior of test tube R is overcome by the spring, thereby causing the unrestrained tube to be pushed upwardly until the bottom of the tube reaches a predetermined level relative to the top surface of the tray member. This predetermined level is determined by the limit provided by pedestal lip 15A to the upward movement of washer 23 under the influence of spring 20.

The photoelectric devices 17 are preferably light-emitting diodes (e.g., General Electric Photon Coupled Interrupter Module H 13B1 or H 13B2) which are mounted on suitable brackets within the housing 14. Each device 17 has a slot **17*a* formed therein for receiving a flag 22*a* forming a part of the tripping unit 22 carried on shaft 19. The flag 22*a* normally rests within the slot 17*a* thereby blocking the photocell of the device. If there is no test tube R aligned with a holder 21, then upon upward movement of the pedestal and housing, there will be no resistance encountered by the holder 21 and, thus, no compression of the spring 20 will occur and the flag 22*a* will remain in a photocell-blocking position within the slot. If, however, there is a restrained test tube disposed within the path of movement of the pedestal whereby the cup-like tube holder 21 makes contact with the bottom of the tube, then coil spring 20 will compress as the pedestal and housing continue their upward movement. As the spring is compressed, the tripping flag 22*a*** will move away from its photocell-blocking position, thereby causing a signal to be generated and fed into the computer indicating the existence of a tube R at a particular location.

The range of vertical travel of housing 14 and pedestals 15 is suitable to handle test tubes of various standard lengths having tolerances within those lengths. Conventional test tubes are available in 75mm. 100mm. or 125 mm. lengths but for any given size the length thereof may vary ± 4 mm. While the photoelectric device 17 detects the distance a test tube depends, the particular length of the test tube, be it 75, 100, or 125 mm., must be determined by a measuring apparatus 26, see FIG. 1, which employs similar light-emitting diodes and photoelectric principles. One component of apparatus 26 is a vertical and stationary channel 27. A series of longitudinally spaced slots **27*a* and *b*, 28*a* and *b*, 29*a* and *b*, and 30*a* and *b*, are formed in the parallel flanges 27' and 27'' of the channel. The slotted channel flange 27'' cooperates with electro-optical device 31 which is mounted to the bottom surface of the bottom plate of housing 14 and movable as a unit therewith. Similarly, the slotted channel flange 27' cooperates with another electro-optical device 31' which is mounted to the top surface of the bottom plate of housing 14** and movable as a unit therewith. Each electro-optical device consists of a light generator and a light detector. In this particular embodiment, the light generator is a light emitting diode, and the light detector is a photodiode or transistor.

Thus, when housing 14 moves upwardly, carrying cup-like holders 21, the electro-optical devices will move upwardly a like amount causing device 31 to move past the flange slots **28*a* and *b*, 29*a* and *b*, and 30*a* and *b*. When a cup-like holder 21 contacts the bottom of a restrained test tube, the tripping flag 22*a* associated with that holder moves out of its photocell-blocking position and simultaneously therewith the device 31 will detect which flange slot is aligned therewith, thereby indicating to the computer the length and tolerance of the engaged tube R. For example, if the tube is 75mm., after flag 22*a* has tripped, then slot 28*b* will come into alignment with device 31, causing the housing to come to rest in that position. Conversely, if the tube is 125mm., after flag 22*a* has tripped, then slot 30*b* will come into alignment with device 31** causing the housing to stop in such position. The *a* slots serve as limiters, so that if there is no tube aligned with one of the holders, the electro-optical device will eventually become aligned with either flange slots **28*a*, 29*a*, or 30*a*, and automatically cause the housing to come to rest. Consequently, the existence and length of a test tube, including any tolerance, is readily detected and measured by the apparatus 26. Reset is accomplished at the end of the cycle, since the housing 14 is automatically programmed to move downwardly until electro-optical device 31' senses slot 27*b*, and device 31 senses slot 27*a***, whereupon the housing rests to await the command for the next cycle.

As was mentioned, the tubes are held immovable during a portion of the sensing and leveling process. The ± 4 mm. tolerance is compensated for when the coil spring 20 is allowed to relax and all of the tubes are pushed thereby so that their bottom surfaces are in a common horizontal plane. The restraint of the tubes R is accomplished by a horizontally disposed, slotted arm 33 which forms a part of the aforementioned stripper assembly 34, see FIG. 2. The arm 33 extends across the top of the open ends of the test tubes forming a row and is adapted at a predetermined interval to simultaneously contact the tubes of the row. The assembly 34 during its first movement is brought downwardly so as to press the open ends of the tubes until the same are disposed in a common horizontal plane located slightly above the annular flanges **13*a*** of the retainer members.

The mechanism for imparting vertical movement to arm 33 is shown in FIG. 2 and consists of a cam assembly 35 provided with a disc 36 eccentrically mounted on the shaft 37*a* of a motor 37. The periphery of disc 36 is engaged by a follower 38*a* mounted transversely on the lower end of a spring-loaded push rod 38*b*. The upper end of rod 38*b* is affixed to one end of arm 33. The push rod is journaled for vertical movement within a portion of a C-shaped bracket 32. The bracket 32 includes a bight portion 32*a* which interconnects an upper portion 32*b* and a lower portion 32*c*. Portions 32*b* and 32*c* are provided with vertically aligned openings through which the push rod extends. Fixedly mounted on push rod 38*b* and positioned between bracket portions 32*b* and *c* is a collar 39. Disposed between collar 39 and lower bracket portion 32*c* is a coil spring 40 which exerts an upward bias on the rod causing the follower 38*a* to remain in continuous contact with the periphery of the eccentrically mounted disc 36.

Upon a given signal, motor 37 will cause the shaft 37*a* thereof to rotate through a predetermined sector and thus result in the rod 38*b* and arm 33 moving downwardly a predetermined amount. After the tubes have been pushed downwardly by the arm 33, the arm 33 will remain in its down position during an interval of the sensing and/or leveling operation heretofore described. The positioning of the tube bottoms in a common horizontal plane is particularly important in connection with the sequence of operation to which the tubes are subsequently subjected. Once the test tubes have been sensed and leveled, they may be automatically filled by a dosing tip with a given amount of the sample fluid. The tip must not contact the inside of any given test tube R or else damage or contamination of either the specimen or the tip might result. As explained in the aforementioned copending applications, the tray members are automatically transported such that once a given row of test tubes R have been sensed and leveled, the tray moves forward so that the next row of tubes R may be sensed and leveled in a like manner.

After all of the tubes of a row have been automatically filled with the fluid sample, the trays are transported to a station wherein the row of tubes are in alignment with a dispensing apparatus for various reagents. The reagents are added automatically and the amount and type of reagents added to the samples are dependent upon the instructions programmed in the computer. After the addition of the reagents, it is necessary that the sample fluid and the reagents be properly mixed by the application of an orbital motion to the bottoms of the freely depending tubes R so as to effect vertical motion to the fluid within the test tubes R without directly contacting the fluid.

Apparatus 42, shown in FIG. 3, is used to impart simultaneous orbital motion to the bottoms of the test tubes of a row when the tray 11 carrying the tubes is disposed at a predetermined station the apparatus subtends the tray member 11 and includes cups 43 mounted on the ends of upright shafts 44 and offset with respect to the longitudinal axes thereof so that when the shafts are rotated about their axes, the cups will move eccentrically. The offset for each cup is about 0.046 inch and the open end of the cup is sized slightly larger than the bottom diameter of the tubes R, thereby facilitating the tube bottom being accommodated in the cup when the latter is moved upwardly into position. The orbiting mechanism for apparatus 42 includes three upstanding pedestals 45*a* through which shafts 44 pass and are suitably bushed. The pedestals are mounted in spaced parallel relation on a hollow support 45 which is adapted to move in a vertical direction. To elevate support 45 sufficiently so that each cup accommodates a tube aligned therewith without causing damage to the tube, a photoelectrically controlled mechanism 46 is provided. Mechanism 46 is similar to apparatus 26, aforedescribed, and includes a vertical and stationary channel 47. The channel 47 cooperates with a diode 48 fixedly mounted to support 45. Slots 49*a*, 49*b*, 49*c*, 49*d*, and 49*e* formed in the sides of the channel 47 serve to either locate the orbiting apparatus for test tubes of 75, 100 or 125 mm. in length.

As described previously, a computer has received a signal indicating the length of a particular row of test tubes and this information, in turn, is used to identify the particular slot (49*a*, 49*b* or 49*c*) to which the orbiting apparatus 42 should be raised in order to properly surround the bottoms of test tubes R. After the orbiting apparatus is in position with cups 43 surrounding the test tubes, a motor 50 and a suitable gear train 51 carried on the support 45 rotate the shafts 44 thus simultaneously imparting an orbital motion to the bottoms of a row of freely depending test tubes R. Operation of the motor is controlled by the computer. It has been found that the application of motor power for a ⅛ of a second followed by a rest interval of like duration if repeated three times will normally impart adequate vortical motion to the fluids within the test tubes to effect the required mixing.

Thus, it will be seen that a sensing, leveling and mixing apparatus has been provided which is of simple, sturdy and lightweight construction. The apparatus is readily capable of simultaneously accommodating a plurality of receptacles and permits the automated handling of receptacles of different sizes thereby facilitating the accurate preparation of samples.

We claim:

1. An apparatus for sequentially sensing, leveling and moving a plurality of tubular receptacles having open upper ends, said apparatus comprising a support unit for accommodating the receptacles whereby the upper end of each receptacle is frictionally engaged by means carried on the support unit and the lower end of each receptacle depends freely from the support unit, said support unit being intermittently moved to successive stations; sensing and leveling means disposed at a first station and having a first member positioned over said unit when the latter is at the first station and being vertically adjustable relative to said unit, said first member, when moving in one direction, being adapted to engage the upper ends of a predetermined number of receptacles and cause the latter to assume a first vertical position with respect to said support unit, and a second member disposed beneath said unit when the latter is at the first station and being vertically adjustable in timed sequence with said first member, said second member being movable upwardly and adapted to resiliently engage the lower ends of the predetermined number of receptacles while the latter are held in the first vertical position by said first member, said second member moving the resiliently engaged receptacles to a second vertical position when said first member moves out of engagement with the upper ends of said predetermined number of receptacles whereby the latter, when in said second vertical position, have the lower ends thereof disposed in a common horizontal plane; and means disposed at a second station for engaging and imparting orbital motion to the receptacle lower ends disposed in said common plane when said support unit is disposed at said second station.

2. The apparatus of claim 1 wherein said support unit includes a horizontally disposed tray member with openings and retainer elements loosely disposed within the openings, each retainer element being adapted to frictionally embrace the upper end of a receptacle, the upper end of the receptacle being adapted to move vertically relative to said retainer element when the receptacle is engaged by the first and second members of said sensing and leveling means.

3. The apparatus of claim 2 wherein the openings of said tray are arranged in parallel rows and all of the receptacles in a given row are adapted to be simultaneously engaged by the first and second members of said sensing and leveling means.

4. The apparatus of claim 3 wherein the first member includes a horizontally disposed elongated arm overlying the upper ends of the receptacles in a given row.

5. The apparatus of claim 1 wherein the second member of said sensing and leveling means includes a plurality of resiliently mounted cup-shaped elements adapted to engage the lower ends of the receptacles aligned therewith; all of said elements being adapted to initially move upwardly in unison and then to continue upward movement independently of one another.

6. The apparatus of claim 5 wherein the initial movement of said second member cup-shaped elements is detected by a first photoelectric means.

7. The apparatus of claim 6 wherein the independent vertical movement of said second member cup-shaped elements is detected by a second photoelectric means.

8. The apparatus of claim 3 wherein said means for imparting orbital movement includes a plurality of cups eccentrically mounted on elevatable supports, the latter being rotatable about vertical axes.

9. The apparatus of claim 8 wherein the movement of said elevatable supports is controlled by a third photoelectric means.

* * * * *